United States Patent
Brinda et al.

(10) Patent No.: US 8,457,691 B2
(45) Date of Patent: *Jun. 4, 2013

(54) SCROLLABLE COMPUTING DEVICE DISPLAY

(75) Inventors: David R. Brinda, Sammamish, WA (US); Robert C. J. Pengelly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 202 days.

This patent is subject to a terminal disclaimer.

(21) Appl. No.: 12/971,489

(22) Filed: Dec. 17, 2010

(65) Prior Publication Data

US 2011/0086675 A1    Apr. 14, 2011

Related U.S. Application Data

(63) Continuation of application No. 11/649,398, filed on Jan. 4, 2007, now Pat. No. 7,907,974.

(51) Int. Cl.
*H04M 1/00* (2006.01)
*H04B 1/38* (2006.01)

(52) U.S. Cl.
USPC ......... 455/566; 455/90.1; 455/90.2; 345/156; 345/169

(58) Field of Classification Search
USPC ............. 455/90.1, 90.2, 550.1, 566; 345/156, 345/169
See application file for complete search history.

(56) References Cited

U.S. PATENT DOCUMENTS

| | | | |
|---|---|---|---|
| 5,495,566 A | 2/1996 | Kwatinetz | |
| 5,936,618 A | 8/1999 | Spiero et al. | |
| 6,249,689 B1 | 6/2001 | Aizawa | |
| 6,337,694 B1 | 1/2002 | Becker et al. | |
| 6,366,302 B1 * | 4/2002 | Crosby et al. | 715/786 |
| 6,580,436 B1 | 6/2003 | Hishida et al. | |
| 6,839,575 B2 | 1/2005 | Ostergaard | |
| 7,065,387 B2 | 6/2006 | Engstrom | |
| 7,071,919 B2 | 7/2006 | Hinckley et al. | |
| 7,081,905 B1 | 7/2006 | Raghunath | |
| 7,263,380 B2 * | 8/2007 | Foxenland | 455/550.1 |
| 2006/0199616 A1 | 9/2006 | Landschaft et al. | |
| 2006/0246940 A1 | 11/2006 | Foxenland | |

FOREIGN PATENT DOCUMENTS

EP    0880091 B1    11/1998

OTHER PUBLICATIONS

Taivalsaari, Antero, "The Event Horizon User Interface Model for Small Devices", Retrieved at <<http://research.sun.com/techrep/1999/smli_tr-99-74.pdf>> Mar. 1999, pp. 25.

Chaturvedi, Abhishek, "Accelerometer supported Tilt as an input method for Mobile devices", Retrieved at <<http://www.memsic.com/memsic/pdfs/an-00mx-013.pdf>> pp. 9.

* cited by examiner

*Primary Examiner* — Tuan H Nguyen
(74) *Attorney, Agent, or Firm* — Alleman Hall McCoy Russell & Tuttle LLP

(57) ABSTRACT

The display of a scrollable list of items is described. In one disclosed embodiment, a list of items may be displayed on a scrollable computing device display in such a manner that, upon receiving an input requesting movement of a select indicator to a different list item, the select indicator is moved on the display toward the different list item and the list is scrolled on the display in an opposing direction.

16 Claims, 4 Drawing Sheets

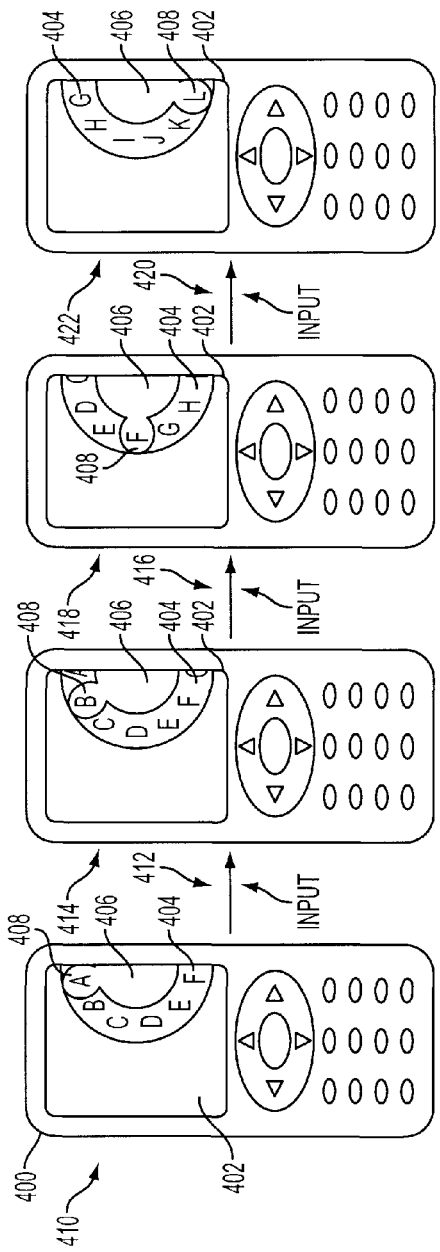
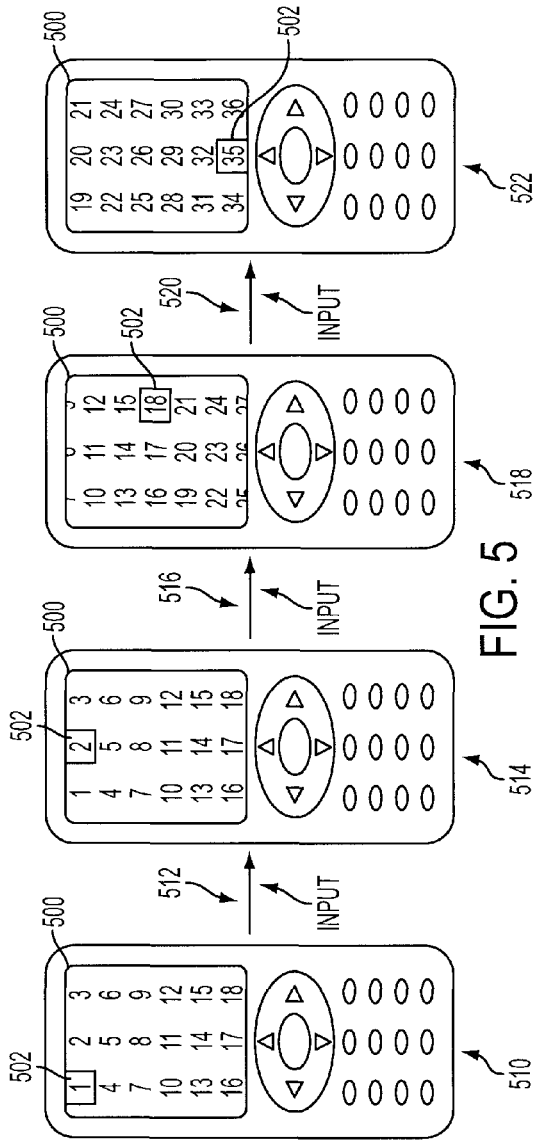
FIG. 4
FIG. 5

SCROLLABLE COMPUTING DEVICE DISPLAY

RELATED APPLICATIONS

This is a continuation of U.S. patent application Ser. No. 11/649,398, filed on Jan. 4, 2007, entitled "SCROLLABLE COMPUTING DEVICE DISPLAY", the entire contents of which are hereby incorporated by reference.

BACKGROUND

Computing devices may be configured to present lists of files, folders, applications, and other resources to a user via a scrollable interface on a display. Scrollable displays may include a scroll bar configured to allow a user to scroll through a list quickly, and to convey information regarding a size of the list and a location of the displayed portion of the list relative to a beginning and end of the list. The scroll bar may include a "scroll box" or "scroll thumb" which can be dragged via a mouse or other input device to cause the list to scroll, and a select indicator that highlights which list item is currently selectable. The location of the scroll thumb within the scroll bar may indicate a relative position of the displayed list items in the overall list, and the length of the scroll thumb relative to the length of the scroll bar may indicate a size of the list.

Some computing devices, such as cellular phones, personal digital assistants, and portable media players, may have relatively small display screens. Some such devices may include a touch screen interface that allows a user to interact with and manipulate a scroll bar and scroll thumb for list browsing. However, on devices without touch-enabled screens, the use of the scroll bar and scroll thumb is limited to conveying list size and location information. Therefore, the scroll bar and scroll thumb may interfere with content presentation on the display in a way that provides little or no interaction benefit, and may occupy space that could otherwise be used to present content.

SUMMARY

Accordingly, the display of a scrollable list of items in a manner that conveys information regarding a size of the scrollable list and a relative location within the list of a select indicator in a space-efficient manner is described in the Detailed Description below. For example, in one disclosed embodiment, a list of items may be displayed on a scrollable computing device display in such a manner that, upon receiving an input requesting movement of a select indicator from a currently selectable list item to a different list item, the select indicator is moved on the display toward the different list item and the list is scrolled on the display in an opposing direction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows another embodiment of a computing device with a scrollable display, and illustrates a scrolling of a list on the display.

FIG. 5 shows another embodiment of a scrollable display for a computing device, and illustrates a scrolling of a list on the display.

DETAILED DESCRIPTION

Figure 1:
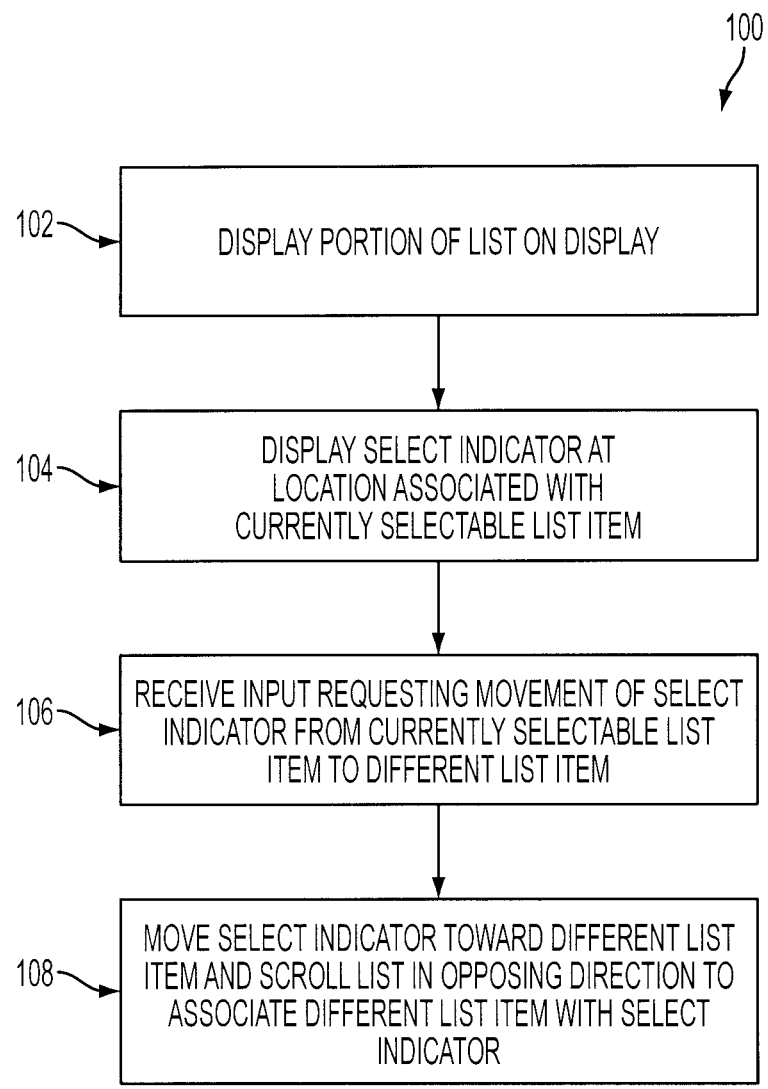
FIG. 1 shows a process flow of an embodiment of a method for displaying a scrollable list on a computing device display.

FIG. 1 shows an embodiment of a method 100 for displaying a scrollable list on a computing device display. Before proceeding with the description of FIG. 1, it will be understood that the term "computing device" may include any device that electronically executes one or more programs, including but not limited to personal computers, servers, laptop computers, hand-held devices, cellular phones, portable media players, and micro-processor-based programmable consumer electronics and/or appliances. The embodiments described herein may be implemented on such a computing device, for example, via computer-executable instructions or code, such as programs, stored on a computer-readable storage medium and executed by the computing device. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

Referring again to FIG. 1, method 100 first includes, at 102, displaying a portion of a list on a scrollable interface or scrollable portion of a display, and at 104, displaying a select indicator at a location associated with currently selectable list item. The terms "scrollable portion of a display" and "scrollable display" as used herein may refer to any portion of a display, such as a window or interface shown on the display, that provides for the ability to scroll through a list too long to be fully displayed at one time. The portion of the scrollable display on which list items are displayed may be referred to herein as the "field of view" of the display.

The scrollable display may be configured to display the list as scrollable in one dimension, such as a vertical direction, or may be configured to display the list as scrollable in multiple directions, such as vertically and horizontally, rotationally, etc. Likewise, the items in the list may be represented in any suitable form, such as text, icons, thumbnails, etc., and may represent files, folders, programs, and/or any other suitable type of content.

Furthermore, the select indicator may take any suitable form. For example, in some embodiments, the select indicator may take the form of a "highlight bar" positioned over and/or around a list item that is currently selectable by a user. In other embodiments, the select indicator may be positioned adjacent to, instead of over and/or around, a currently selectable item, such as to a side of the currently selectable item. In each of these examples, the select indicator may be considered to be "associated with" the currently selectable item in that it indicates to a user which list item is currently selectable.

Continuing with FIG. 1, method 100 further includes, at 106, receiving an input requesting movement of select indicator from a currently selectable list item to a different list item. The different list item may be located adjacent to the currently selectable list item, or may be spaced from the currently selectable list item by one or more other list items. The term "different list item" as used herein means only that the different list item is not the same list item as the currently selectable list item, and is not meant to signify anything about the content of either list item. The input received at 106 may be received from a touch screen interface, keyboard, keypad, mouse, trackball, touchpad, joystick, or any other suitable input device or combination of input devices.

Upon receipt of the input requesting movement of the select indicator, method 100 next includes, at 108, moving the select indicator toward the different list item and scrolling the list in an opposing direction to associate the different list item with the select indicator. The movement of the select indicator and the list on the display may be simultaneous, partially overlapping, substantially nonoverlapping, sequential, or may occur in any other suitable temporal order. No matter the timing of the movement, the select indicator and the list both change position on the display when movement of the select indicator to a different list item is requested. In this manner, a size of a list may be indicated to a user by the relative motions of the select indicator and list by correlating a degree of movement of the select indicator and the list to a size of the list. Likewise, a relative position of the displayed items within the list may be indicated to a user by correlating a location of the select indicator on the display to a position of the currently selectable item in the list relative to a beginning and/or end of the list. This is in contrast to other scrollable displays in which, upon receiving an input requesting movement of the select indicator, the select indicator moves on the screen without any accompanying list movement until approaching or reaching an edge of the scrollable interface, at which time the list begins to scroll without any accompanying movement of the select indicator on the screen.

Figure 2:
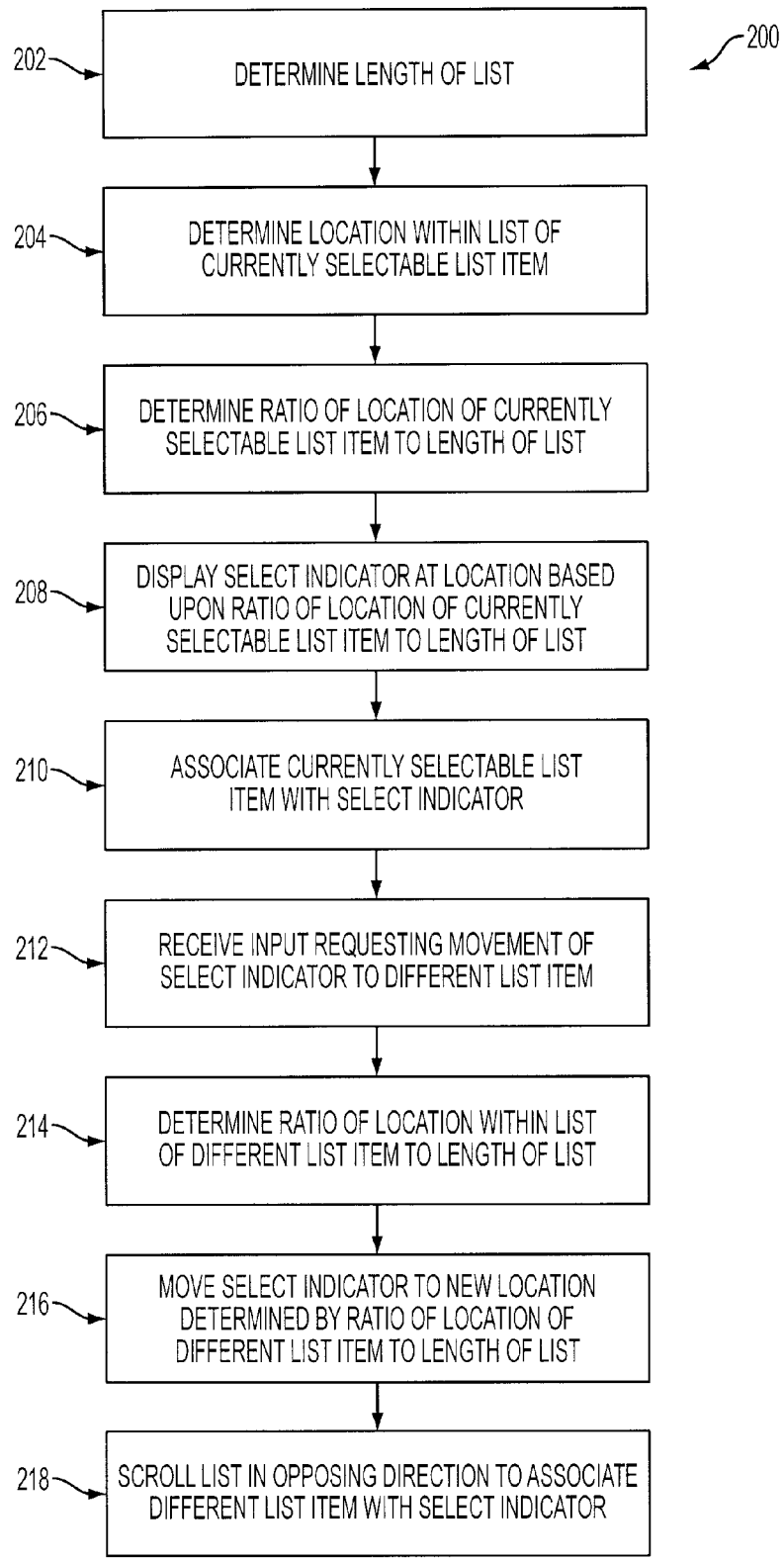
FIG. 2 shows a process flow of another embodiment of a method for displaying a scrollable list on a computing device display.

The movement and position of the select indicator and the list may be correlated to the size of the list and the location of the currently selectable item within the list in any suitable manner. FIG. 2 shows an embodiment of a method 200 for correlating the movement and positions of the list and select indicator with the size of the list and the relative position of the select indicator within the list. Method 200 includes, at 202, determining a length of the list, and then, at 204, determining the location of a currently selectable list item in the list. The length of the list may be determined in any suitable fashion. For example, in the case of a list in which the list items are displayed in one browsable direction (e.g. where the select indicator may be moved only vertically or only horizontally), the length of the list may correspond to a number of items in a list. Alternatively, in the case of a list in which the items are displayed in two directions (e.g. where the select indicator may be movable both horizontally and vertically), the length of the list may correspond to a number of rows of list items or columns of list items displayed on the scrollable interface. Likewise, the location of the currently selectable list item in the list may correspond to an absolute position in the list, or to a row or column number in which the currently selectable list item is located. Examples of such scrollable displays are described in more detail below.

Next, method 200 includes, at 206, determining a ratio of the location of the currently selectable list item to the length of the list, and, at 208, displaying the select indicator on the scrollable display at a location based upon the ratio of the location of the currently selectable list item to the length of the list. Then, at 210, method 200 includes positioning the list on the display to associate the currently selectable list item with the select indicator. For example, if a list has forty total items, the currently selectable item is the tenth item, and the list is scrollable only along vertical directions, the ratio determined at 206 would be equal to 0.25. In this case, the select indicator would be displayed at a location on the scrollable display based on this ratio, and the list would be scrolled to associate the tenth list item with the select indicator.

The location at which the select indicator is displayed may be based on the ratio of the location of the currently selectable list item to the length of the list in any suitable manner. Examples include, but are not limited to, any manner that conveys information related to the relative location of the currently selectable list item in the overall list. For example, in one embodiment, the select indicator is displayed at a location spaced from a beginning or end of the field of view of the scrollable display by a percentage of the total field of view equal to the ratio. As a specific example, where the ratio of the location of the currently selectable list item to the length of the list is 0.25, the select indicator may be positioned at a location approximately 25% from the beginning or an end of the field of view of the scrollable display. This spacing may be measured from any suitable location on the select indicator, including but not limited to a top edge, a bottom edge, a centerline, etc. of the select indicator. In alternative embodiments, this ratio may be modified by mathematical functions to achieve desired scrolling effects.

Next, method 200 includes, at 212, receiving an input requesting movement of the select indicator to a different list item. Upon receipt of this input, method 200 includes, at 214, determining a ratio of the location of the different list item within the list. Next, at 216, the select indicator is moved to a new location on the scrollable display based upon the ratio of the location of the different list item to the length of the list, and, at 218, the list is scrolled in an opposing direction to associate the different list item with the select indicator.

It will be appreciated magnitude of the relative movement of the select indicator on the display as it moves from one list item to an adjacent list item according to method 200 decreases as the size of the list increases. For example, where a list has ten items, movement of the select indicator down one list item results in the movement of the select indicator one tenth of the field of view of the scrollable display. In contrast, where a list has one hundred items, movement of the select indicator down one list item results in the movement of the select indicator one one-hundredth of the field of view of the scrollable display.

Likewise, the increment of movement of the list in the opposing direction increases with increasing list size. Therefore, the increment of movement of the select indicator on the scrollable display relative to the increment of movement of the list in the opposing direction conveys information regarding a total length of the list. In this manner, method 200 may be used to convey information regarding both the overall size of a list and the relative position of a currently selectable item within a list without the use of a scroll bar or scroll thumb.

Method 200 involves the "absolute positioning" of the select indicator and the "relative positioning" of the list in that the select indicator position is determined by the mathematical relationship between the currently selectable list item and the total length of the list, while the list position is set based upon the select indicator position. In alternative embodiments, the list may be positioned in an absolute manner and the select indicator may be positioned relative thereto, or both the select indicator and the list may be positioned in an absolute manner.

Figure 3:
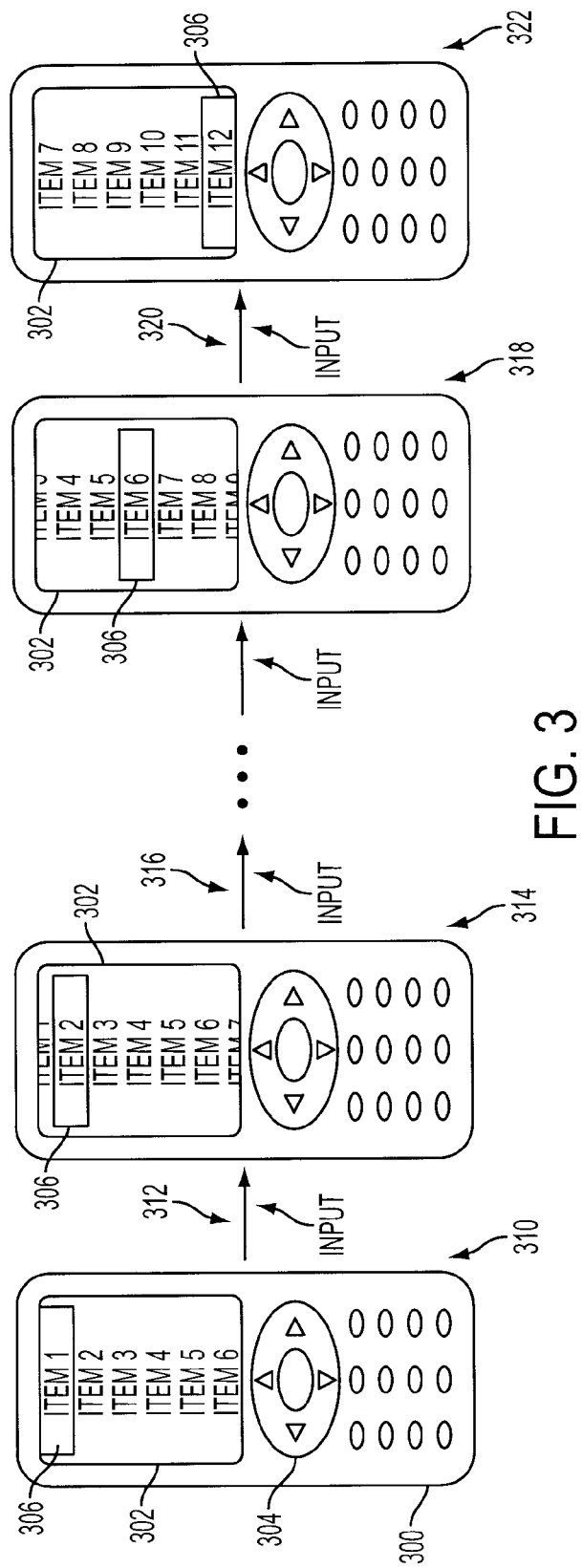
FIG. 3 shows an embodiment of a computing device with a scrollable display, and illustrates a scrolling of a list on the display.

Methods 100 and 200 may be used with any suitable scrollable display. FIGS. 3-5 show three examples of scrollable displays on which these methods may be implemented, and also show how each of these displays changes as a user moves a select indicator on each display. It will be appreciated that these figures are shown merely for the purpose of example, and are not intended to be limiting in any manner.

First, FIG. 3 shows a computing device in the form of a mobile device 300 having a vertically scrollable display 302 on which six items from a longer list of items are displayed. Mobile device 300 includes an input device 304 in the form of arrow keys and an "enter" key that allow a user to move a select indicator 306 on display 302 and to select a list item via the select indicator. Alternatively, mobile device 300 may include a touch screen input device, or any other suitable input device.

As depicted in FIG. 3, the list has a total length of twelve items. Therefore, as shown at 310, when select indicator 306 is associated with "item 1" of the list, it is positioned such that a lower edge of select indicator 306 is at a relative location approximately $1/12$ from a top of a field of view of display 302. In alternative embodiments, an upper edge or an intermediate portion of select indicator 306 may be used as a reference point to position the select indicator.

Next, when a user inputs a request 312 to move select indicator 306 down one position, select indicator 306 is moved to a relative position $1/6$ of the total field of view from the top of the field of view of display 302, and the list is scrolled upwardly to associate "item 2" of the list with the select indicator, thereby scrolling "item 1" partially out of view and "item 7" partially into view. This is shown at 314 in FIG. 3. Upon the receipt of further inputs 316 from the user requesting movement of select indicator 306 to "item 6", select indicator 306 is moved to a relative location approximately $1/2$ down the field of view of display 302, and the list is scrolled upwardly to associate "item 6" of the list with the select indicator. This is shown at 318 in FIG. 3. As the user continues to scroll down the list via additional inputs 320, select indicator 306 continues to move down display 302 while the list continues to scroll in an opposing direction. Upon reaching "item 12" of the list, as shown at 322, select indicator 306 is positioned at the bottom of the display (i.e. at a relative location 12/12 down the field of view of display 302), and the list is positioned to associate "item 12" with select indicator 306.

Next, FIG. 4 shows a computing device in the form of a mobile device 400 having a rotationally scrollable display 402 on which six items from a list of twelve total items are displayed in a list field 404. Display 402 also has a select indicator 406 in the form of a tab 408 that extends from an inner semi-circular center portion to surround a currently selectable list item.

As shown at 410, when select indicator 406 is associated with item "A" of the list, it is positioned at an uppermost position from a top of list field 404. When a user inputs a request 412 to move select indicator 406 down one position to list item "B", select indicator 406 rotates counterclockwise to a relative position $1/6$ of the total field of view from the top of the field of view of display 402, and the list is scrolled in list field 404 in a clockwise direction to associate item "B" of the list with the select indicator, thereby scrolling item "A" partially out of view and item "G" partially into view. This is shown at 414 in FIG. 4. Upon the receipt of further inputs 416 from the user requesting movement of select indicator 406 to item "F", select indicator 406 is moved to a relative location approximately $1/2$ along list field 404, and the list is scrolled upwardly to associate item "F" of the list with the select indicator. This is shown at 418 in FIG. 4. As the user continues to scroll down the list via additional inputs 420, select indicator 406 continues to rotate counterclockwise while the list continues to scroll in an opposing direction in list field 404.

Upon reaching item "L" of the list, as shown at 422, select indicator 406 is positioned adjacent to the bottom of the display (i.e. at a relative location approximately $12/12$ down the field of view of display 402), and the list is positioned within list field 404 to associate item "L" with select indicator 406.

As mentioned above, methods 100 and 200 may also be utilized with displays that are browsable or scrollable in more than one direction. FIG. 5 shows an example of a display 500 that is browsable in both a horizontal and vertical direction. Display 500 is shown in FIG. 5 apart from the context of a computing device, but it will be appreciated that display 500 may be used with any suitable computing device.

Referring first to 510, six lines of list items having three list items per line are shown on display 500, and a select indicator 502 is shown associated with a first list item, labeled "1." Upon receipt of an input 512 requesting movement of select indicator 502 to item "2", select indicator 502 is moved horizontally to item "2." This is shown at 514 in FIG. 5. Because movement of select indicator 502 from item "1" to item "2" does not involve moving select indicator 502 vertically between lines of list items, no vertical scrolling of the list occurs. Likewise, because display 500 as depicted is browsable but not scrollable in a horizontal direction, no horizontal scrolling occurs. However, it will be appreciated that display 500 may be configured to be horizontally scrollable in the manner described above for methods 100 and 200.

Next, upon receipt of further inputs 516 requesting movement of the select indicator to item "18" of the list, select indicator 502 moves to a position on display 500 indicative of the position of item "18" within the overall list. For example, where the list has twelve lines of items with three items per line, select indicator 502 may be moved to a position based upon a ratio of the line number in which item "18" appears to a total number of lines of items in the list. Where item "18" appears on the sixth line of twelve total lines, select indicator 502 may be displayed at a location approximately halfway between a top and a bottom of display 500, and the list may be scrolled upwardly to associate item "18" with the select indicator. This is shown at 518 in FIG. 5. Receipt of further inputs 520 requesting movement of select indicator 502 to item "35" causes select indicator 502 to move to a location on display indicative of the position of this item in the list. Because this item appears in the last line of the list, select indicator 502 is moved to a location adjacent to a bottom edge of display 500, as shown at 522, and the list is scrolled in an opposing direction to associate item "35" with select indicator 502.

In some embodiments, the rates at which the select indicator and list are scrolled may be varied depending upon the specific nature of a user input and/or the position of the select indicator within the list. For example, in one specific embodiment, the scrolling of the select indicator and list may be configured to initially start slowly, and then increase in speed as the user continues to activate a scroll input. For example, where the scroll input is a keypad key, the speed of scrolling may increase as a user continues to press the key. Then, upon nearing the end of the list, the scrolling may be configured to slow progressively to achieve a "soft landing" effect at the end of the list.

Likewise, the select indicator may be configured to progressively speed and slow at various intermediate points within list when the user activates the scroll input. For example, in an alphabetized list, the movements of the select indicator and list may be configured to progressively quicken and then slow for each group of list entries having the same first letter. Further, the select indicator may also be configured to progressively slow when a user releases the scroll input, even if the end of the list or the end of an intermediate grouping within the list has not yet been reached.

It will be appreciated that the configurations and/or approaches described herein are exemplary in nature, and that these specific embodiments or examples are not to be considered in a limiting sense, because numerous variations are possible. Furthermore, the specific routines or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of displaying a list of items on a computing device display, comprising:
    displaying a portion of the list on a scrollable portion of the display;
    displaying an indicator on the scrollable portion of the display, wherein displaying the indicator on the scrollable portion of the display comprises displaying the indicator to a side of the list at a relative location on the scrollable portion of the display based upon a ratio of a position of a currently selectable list item within the list to a total list size;
    receiving a touch input requesting movement of the list; and
    in response to receiving the touch input, moving the indicator on the scrollable portion of the display toward a different list item and scrolling the list on the scrollable portion of the display in an opposing direction;
    and wherein moving the indicator on the scrollable portion of the display in a direction toward the different list item comprises determining a ratio of a position of the different list item within the list to the total list size, and displaying the indicator at a relative location on the scrollable portion of the display based upon the ratio of the position of the different list item within the list to the total list size.

2. The method of claim 1, wherein moving the indicator and scrolling the list comprise simultaneously moving the indicator and scrolling the list.

3. The method of claim 1, wherein moving the indicator and scrolling the list in opposing directions comprises moving the indicator and scrolling the list in opposing directions at relative increments representative of an overall size of the list.

4. The method of claim 1, wherein the position of the currently selectable list item comprises a number of the currently selectable item and the total list size comprises a total number of items in the list.

5. The method of claim 1, wherein the position of the currently selectable list item comprises a number of a line of list items in which the currently selectable list item is displayed and the total list size comprises a total number of lines of list items in the list.

6. The method of claim 1, wherein scrolling the list on the scrollable portion of the display in an opposing direction comprises scrolling the list to a position that associates the different list item with the indicator.

7. The method of claim 1, wherein displaying the portion of the list on the scrollable portion of the display comprises displaying the portion of the list on a vertically or rotationally scrollable portion of the display.

8. The method of claim 1, further comprising changing a rate of scrolling as a function of one or more of a length of time a scroll touch input is activated and a position of the indicator within the list.

9. In a computing device comprising a display, a method of representing on the display a size of a list and a location of an indicator within the list, comprising:
    displaying a portion of the list on a scrollable portion of the display;
    displaying the indicator on the scrollable portion of the display at a position to a side of the list and representative of a relative location in the list of a currently selectable list item;
    receiving a touch input requesting movement of the list; and
    moving the indicator and scrolling the list in opposing directions;
    wherein displaying the indicator on the scrollable portion of the display comprises determining a ratio of a position of the currently selectable list item within the list to a total list size, and displaying the indicator at a location spaced from a beginning of the scrollable portion of the display by a relative amount proportional to the ratio.

10. The method of claim 9, wherein moving the indicator comprises determining a ratio of a position of a different list item to a total list size, and moving the indicator to a location on the scrollable portion of the display spaced from a beginning of the scrollable portion of the display by a relative amount proportional to the ratio.

11. The method of claim 10, wherein scrolling the list comprises scrolling the list to associate an adjacent list item with the indicator.

12. A computing device comprising:
    a display;
    a processor; and
    instructions stored on the computing device, wherein the instructions are configured to be executable by the processor to:
        display a portion of scrollable content on the display;
        display an indicator on the display at a location adjacent to the content; and
        move the indicator toward an item in the content and to scroll the content in a direction opposing a direction of movement of the indicator at relative increments representative of an overall size of the content upon receipt of a touch input requesting movement of the content;
    wherein the instructions are further executable to move the indicator toward the item by determining a ratio of a position of the item within the content to a total content size and displaying the indicator at a relative location on the display based upon the ratio.

13. The computing device of claim 12, wherein the instructions are further executable to display the indicator on the display at a position representative of a relative location in the content of the item.

14. The computing device of claim 13, wherein the instructions are further executable to determine a ratio of a position of the item within the content to a total content size, and to display the indicator at a relative location on the display based upon the ratio.

15. The computing device of claim 12, wherein the instructions are further executable to scroll the content to a position that associates the item with the indicator.

16. The computing device of claim 12, wherein the computing device comprises a desktop computer, a laptop computer, a server, a cellular phone, a personal digital assistant, and/or a portable media player.

* * * * *